US011934921B2

(12) United States Patent
Sastri et al.

(10) Patent No.: US 11,934,921 B2
(45) Date of Patent: Mar. 19, 2024

(54) DYNAMIC CONTENT RATING ASSISTANT

(71) Applicant: International Business Machines Corporation, Armonk, NY (US)

(72) Inventors: Vinayak Sastri, Bangalore (IN); Joydeep Mondal, New Delhi (IN); Abhijit Mishra, Bangalore (IN); Seema Nagar, Bangalore (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 16/554,076

(22) Filed: Aug. 28, 2019

(65) Prior Publication Data

US 2021/0065043 A1    Mar. 4, 2021

(51) Int. Cl.
*G06Q 30/00*    (2023.01)
*G06F 16/28*    (2019.01)
*G06N 20/00*    (2019.01)

(52) U.S. Cl.
CPC ........... *G06N 20/00* (2019.01); *G06F 16/285* (2019.01)

(58) Field of Classification Search
CPC ....... G06N 20/00; G06N 20/20; G06F 16/285
See application file for complete search history.

(56) References Cited

U.S. PATENT DOCUMENTS

| | | |
|---|---|---|
| 5,691,972 A | 11/1997 | Tsuga |
| 6,449,766 B1 | 9/2002 | Fleming |
| 9,900,659 B1* | 2/2018 | Norum ................. H04N 21/442 |
| 10,671,854 B1* | 6/2020 | Mahyar .............. G06K 9/00751 |
| 10,897,649 B1* | 1/2021 | Germano ............... G06N 20/00 |
| 2015/0289014 A1 | 10/2015 | Nandi |
| 2015/0363718 A1 | 12/2015 | Boss |
| 2016/0112760 A1* | 4/2016 | Kosseifi ........... H04N 21/44008 725/28 |
| 2016/0314380 A1* | 10/2016 | Abdulkader ........ G06F 18/2411 |
| 2017/0272818 A1* | 9/2017 | Gattis .............. H04N 21/44008 |
| 2018/0165696 A1 | 6/2018 | Bessen |
| 2018/0276565 A1* | 9/2018 | Brandao ................ G06N 5/022 |

OTHER PUBLICATIONS

P. Mell, et al. *"The NIST Definition of Cloud Computing"*, NIST Special Publication 800-145, Sep. 2011, Gaithersburg, MD.
S. Sharma et al. *"Movie Success Prediction Using Neural Network and Opinion Mining"* VJER—Vishwakarma Journal of Engineering Research vol. 2 Issue 1, Mar. 2018.

* cited by examiner

*Primary Examiner* — Yehdega Retta
(74) *Attorney, Agent, or Firm* — Aaron Pontikos; George Blasiak; Heslin Rothenberg Farley & Mesiti P.C.

(57) ABSTRACT

Methods, computer program products, and systems are presented. The methods include, for instance: training of a machine learning model for predicting a rating in certain content rating systems based on training data. The machine learning model includes a plurality of maturity classifiers corresponding to individual features of the previously rated contents. An input content is obtained and features of the input content are extracted by use of respective content analysis tools and subsequently classified by the maturity classifiers of the machine learning model.

20 Claims, 7 Drawing Sheets

DYNAMIC CONTENT RATING ASSISTANT

TECHNICAL FIELD

The present disclosure relates to artificial intelligence and machine learning system, and more particularly to methods, computer program products, and systems for predicting and dynamically adapting to maturity ratings of media content.

BACKGROUND

Conventionally, media contents including motion pictures, TV shows, and song lyrics, are rated for audiences of certain age groups with respect to various types and degrees of mature content. Such rating systems are different from country to country based on the unique cultural and societal background and the level of freedom of expression and/or tolerance of each country. Certain countries have diversified rating systems for minor audiences in which numerous age groups are set and corresponding ratings for each age group are provided primarily for child protection, such that guardians, often parents, can make use of the guidelines in selecting media contents suitable for minor audience in each age group minor in their care. Certain rating systems can be less diversified, and include some form of complete ban even for mature audiences without age concerns. In certain countries, multiple distinctive rating systems exist within the same country according to their national/municipal laws. Motion picture rating systems are particularly of interest as movies are often screened in countries other than the country of origin, with various versions pursuant to an issued rating by a locally applicable rating system.

SUMMARY

The shortcomings of the prior art are overcome, and additional advantages are provided, through the provision, in one aspect, of a method. The method includes, for instance: training, by one or more processor, a machine learning model for predicting a rating in respective content rating systems based on training data including previously rated contents associated with the respective content rating systems, where the machine learning model includes a plurality of maturity classifiers corresponding to individual features of the previously rated contents; obtaining, by the one or more processor, an input content and an objective indicating how to process the input contents; extracting, by the one or more processor, linguistic, visual, and audio features of the input content by use of respective content analysis tools; and classifying, by the one or more processor, the features of the input content as extracted by tagging with respective maturity classifiers of the machine learning model.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
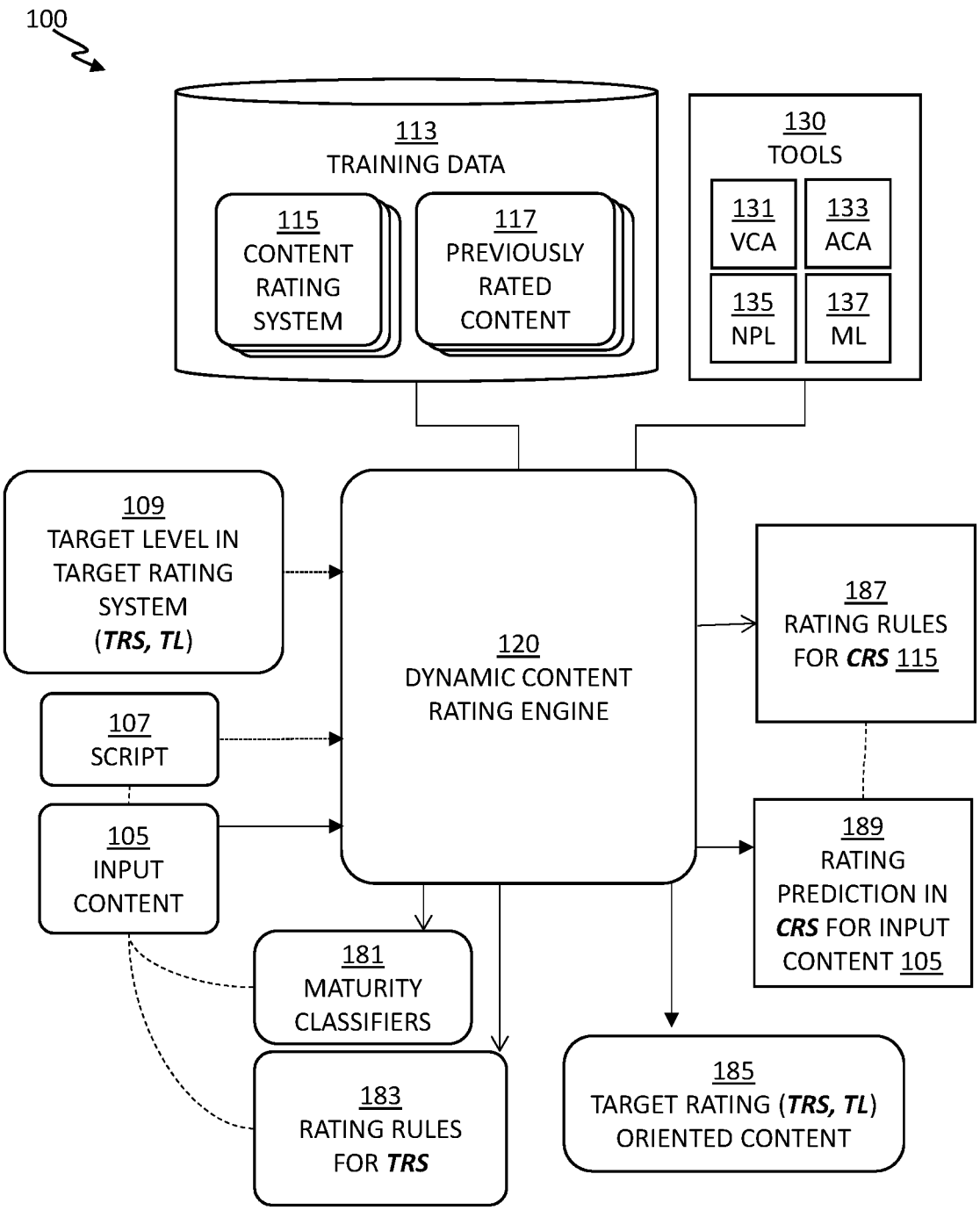
FIG. 1 depicts a cognitive rating system for content rating assistance on media content, in accordance with one or more embodiments set forth herein.

FIG. 1 depicts a cognitive rating system 100 for content rating assistance on media content, in accordance with one or more embodiments set forth herein.

As noted, each country and/or municipality in a country has respective rating systems for distribution of media contents including motion pictures often based on age groups for minor audiences. Respective motion picture rating systems for applicable regions/countries have various ratings based on distinctive standards often with respect to mature content, cultural and societal backgrounds and tolerance of the applicable regions/countries. Even if some rating systems provide descriptions on standards for respective levels associated with a certain age group in expressing certain themes, words, and images, these standards provide very little guidance as actual ratings are determined by people, often selected from members of committees for the respective rating systems. It is often the case where no rule to follow is provided for movies to achieve a certain rating in a particular rating system, even the distribution of the movies critically depends on rating, also referred to as a maturity level, in an applicable rating system.

Embodiments of the present invention recognize that a movie is often filmed and edited for a particular target rating in a particular rating system because it was made with a particular target audience group in mind. Embodiments of the present invention also recognize that previously determined ratings for other movies in certain rating systems can provide insight on how the levels are determined in the respective rating systems. Embodiments of the present invention also recognize that rating systems are respective to both media content type and geographical region. For example, country A can have three different rating systems respective to motion pictures, television shows, and video games for distribution/sales within country A. Embodiments of the present invention recognize that, particularly when multi-media type contents are created and are to be distributed globally, many versions, often referred to as "cut", of the same content according to respective ratings in each jurisdiction of the rating systems need to be generated for the screening by editing the content based on the requirements of a rating.

In this specification, the term "content" indicates any type of media content that is subject to a certain type of rating system in a region and/or a country, depending on local laws.

In this specification, the term "rating" indicates a particular level of maturity within a rating system, and addressed together with the rating system. The term rating can be used interchangeably with "maturity level", or simply "level". After the rating is determined and issued for the rating system, the rating can also be referred to as "certification", "certificate", or "classification" in the rating system.

The cognitive rating system 100 for content rating assistance on the media content includes training data 113, a dynamic content rating engine 120, and tools 130 for cognitive analytics on various input types and machine learning. In certain embodiments of the present invention, the media content is of a type of movie, also formally referred to as "motion picture".

The training data 113 includes a plurality of content rating systems 115 and multiple instances of previously rated content 117 of a particular type to which the content rating systems 115 are applicable. The content rating systems 115 classify the particular type of media contents with regard to suitability for audiences of certain maturity in an applicable geographical area, including a country, a municipality, or any other spatial distinction noted as applicable by each content rating system 115. In this specification, the term "local rating system" indicates a particular rating system applicable in a specific location for a media type of interest. Although each content rating system 115 is applicable to a particular media content type, such as motion picture, television show, etc., and, accordingly, a certain geographic location be subject to numerous rating systems corresponding to each media content type, for the purpose of this specification, the plurality of content rating systems 115 of the training data 113 classify a type of media content in various locations corresponding to each content rating system 115.

The dynamic content rating engine 120 operates in phases. First, in the training phase, the dynamic content rating engine 120 learns the content rating systems 115 and the previously rated contents 117 of the training data 113. The dynamic content rating engine 120 also learns respective rating rules for each of the content rating systems 115 in determining the respective ratings on the previously rated contents 117. The dynamic content rating engine 120 trains a machine learning model with audio, visual, and/or linguistic features extracted from the previously rated contents 117 respective to each content rating system 115, and interrelations between a feature, a rating, and a content rating system 115, from the training data 113. For extracting and classifying features of the previously rated content 117, the dynamic content rating engine 120 utilizes a collection of cognitive analytics/machine learning tools 130, also simply referred to as the tools 130. The tools 130 include a video content analyzer (VCA) 131, an audio content analyzer (ACA) 133, a natural language processing (NPL) tool 135, and a machine learning (ML) tool 137.

Subsequent to the training phase, the dynamic content rating engine 120 obtains an input content 105, extracts linguistic, audio, and/or visual features of the input content 105 by use of the tools 130, classifies each feature corresponding to respective maturity classifiers 181, associates with the input content 105, and generates a rating prediction 189 for the input content 105 in one of the content rating systems 115. As noted, the dynamic content rating engine 120 generates the rating prediction 189 for the input content 105 by cumulatively classifying features of the input content 105 based on rating rules 187 of each content rating system 115 as learnt from the training phase.

The dynamic content rating engine 120 can optionally obtain other inputs of script 107 corresponding to the input content 105, as well as a target level in a target rating system 109. When the dynamic content rating engine 120 obtains the input content 105 without the script 107, the dynamic content rating engine 120 generates the script 107 by separating an audio stream of the input content 105, and processes the audio stream with the ACA tool 133 and the NLP tools 135, particularly a speech-to-text tool and a natural language classification (NLC) tool of the NLP tools 135.

In certain embodiments of the present invention, the dynamic content rating engine 120 obtains the input content 105 with the target level (TL) in the target rating system (TRS) 109, represented as a pair of identifiers (TRS, TL). The dynamic content rating engine 120 infers rating rules for the target rating system (TRS) 183. The dynamic content rating engine 120 tags each feature that may be an issue with a recommendation to achieve the target level in the target rating system (TRS, TL) 109 according to the inferred rating rules for the target rating system (TRS) 183. In certain embodiments of the present invention, the dynamic content rating engine 120 can further produce a target rating (TRS, TL) oriented content 185 by automatically editing the input content 105 based on the recommendations made for the features that raise issues to achieve the target level in the target rating system (TRS, TL) 109.

In certain embodiments of the present invention, the dynamic content rating engine 120 employs a machine learning by classification, in which the dynamic content rating engine 120 learns rating rules applied in the content rating systems 115 in the training data 113 by inference and applies the inferred rating rules to classify features of the input content 105 not present in the previously rated content 117 in the training data 113. As a cumulative result of respective classifications for individual features of the input content 105, the dynamic content rating engine 120 predicts a rating of the input content 109 for respective content rating systems 115 based on the rating rules 187 of the respective content rating systems 115 as learnt from the training phase.

Figure 2:
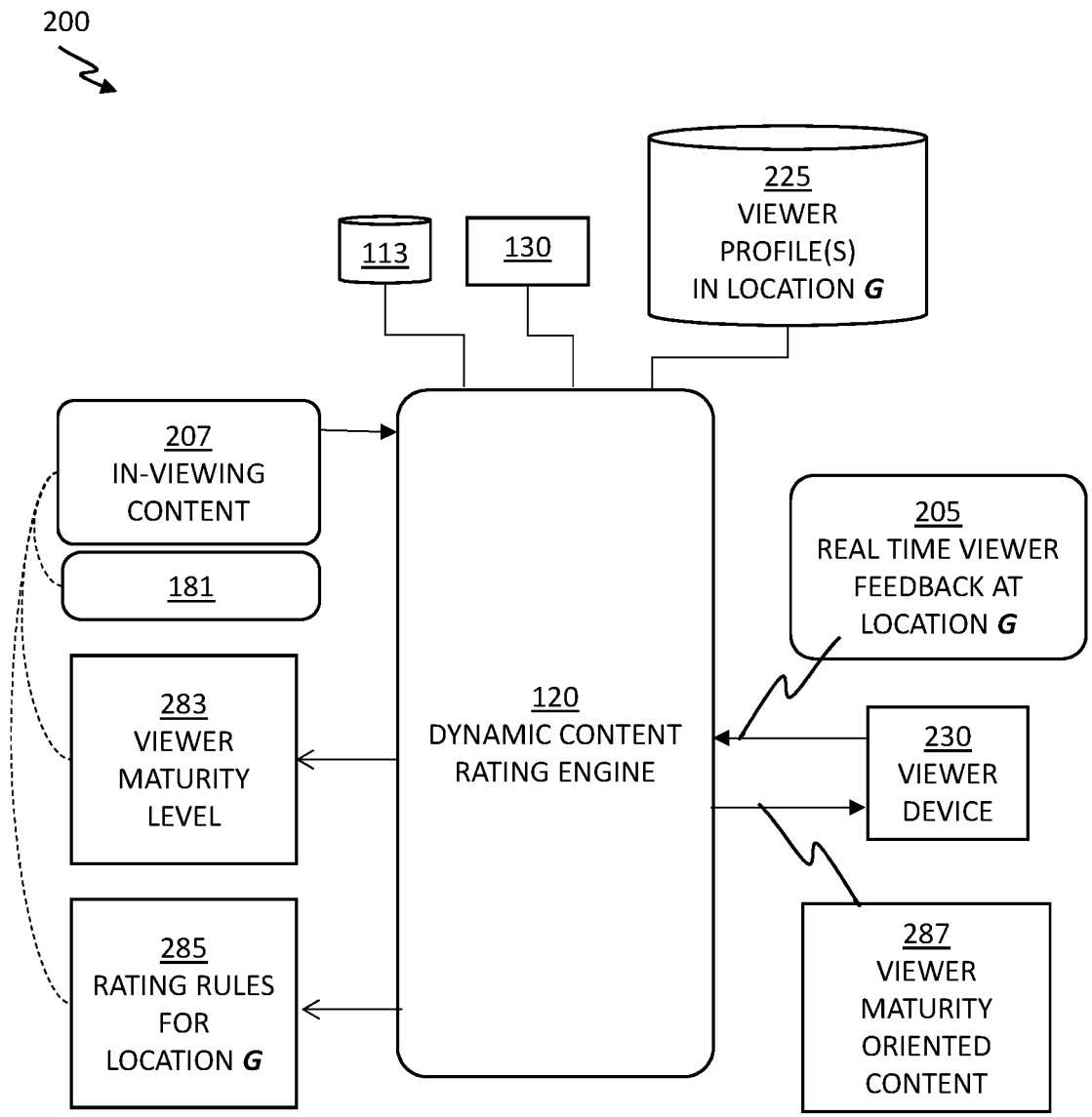
FIG. 2 depicts a viewer response based rating system for dynamic rating of media content and real-time auto-cutting of media content based on viewer response, in accordance with one or more embodiments set forth herein.

FIG. 2 depicts a viewer response based rating system 200 for dynamic rating of media content and real-time auto-cutting of media content based on viewer response, in accordance with one or more embodiments set forth herein.

The viewer response based rating system 200 for dynamic rating of media content and real-time auto-cutting of media content based on viewer response includes the training data 113, the dynamic content rating engine 120 and the tools 130, as in the cognitive rating system 100 for content rating assistance in FIG. 1. The viewer response based rating system 200 further includes viewer profiles in location G 225 and a viewer device 230 that facilitates screening of an in-viewing content 207 and collects real-time viewer feedback at location G 205, which include viewer age by facial recognition and image analysis, facial expressions on various emotions, hand movements and body gestures, or the like demonstrated by the viewers in response to the in-viewing content 207.

As in the cognitive rating system 100 for content rating assistance in FIG. 1, the dynamic content rating engine 120 operates in phases. First, in the training phase, the dynamic content rating engine 120 learns the content rating systems 115 and the previously rated contents 117 of the training data 113 for features of the previously rated contents 117 that might have affected respective ratings in the content rating systems 115. Also as in the cognitive rating system 100 of FIG. 1, the dynamic content rating engine 120 analyzes the in-viewing content 207 for linguistic, audio, and/or visual features that may affect its content rating based on the training data 113 and tags respective maturity classifiers 181 to features of the in-viewing content 207.

The dynamic content rating engine 120 identifies, by inference, a particular content rating system 115 from the training data 113 that is applicable in location G, from which the viewer profiles in location G 225 originate. At the conclusion of the training phase, the dynamic content rating engine 120 infers rating rules for location G 285 based on the content rating system 115 identified for the location G.

During the viewing of the in-viewing content 207 via the viewer device 230, the dynamic content rating engine 120 determines a viewer maturity level 283 based on the real-time viewer feedback at location G 205. The dynamic content rating engine 120 determines whether or not the in-viewing content 207 is suitable for a current viewer generating the real-time viewer feedback at location G 205. The dynamic content rating engine 120 further generates a viewer-maturity oriented content 287 from the in-viewing content 207 by automatically editing certain features not suitable for the viewer maturity level 283 according to the rating rules for location G 285 and the maturity classifiers 181 associated with respective features that concerns the rating rules for location G 285. The dynamic content rating engine 120 subsequently displays the viewer-maturity oriented content 287 on the viewer device 230.

Certain embodiments of the dynamic content rating engine 120 independently facilitate either the cognitive rating system 100 of FIG. 1 or the viewer response based rating system 200 of FIG. 2, in entirety or in part. Certain embodiments of the dynamic content rating engine 120 facilitate both the cognitive rating system 100 of FIG. 1 and the viewer response based rating system 200 of FIG. 2. Detailed operations of the dynamic content rating engine 120 are presented in FIGS. 3 and 4, and respectively corresponding descriptions.

Figure 3:
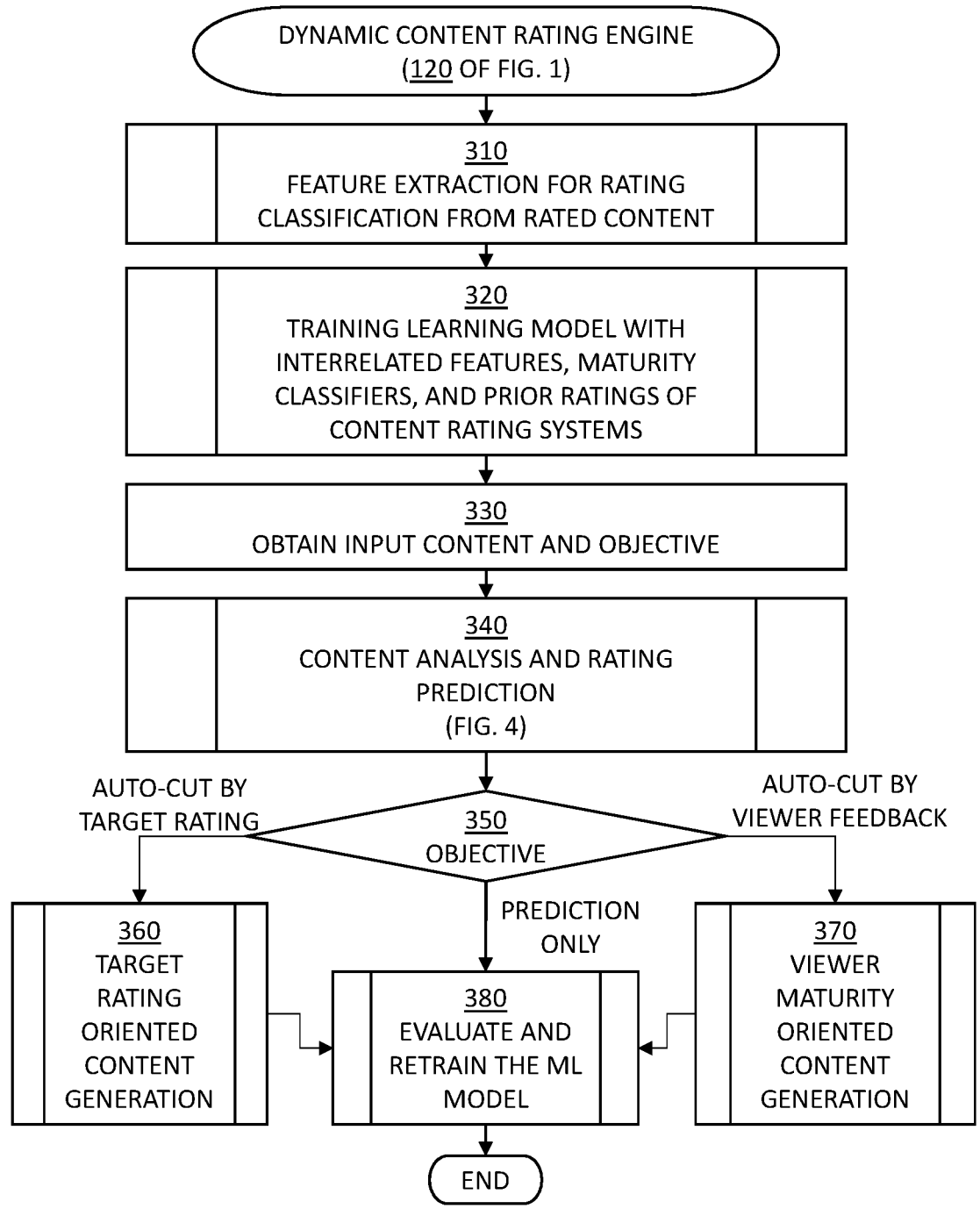
FIG. 3 depicts a flowchart of operations performed by the dynamic content rating engine of FIGS. 1 and 2, in accordance with one or more embodiments set forth herein.

FIG. 3 depicts a flowchart of operations performed by the dynamic content rating engine 120 of FIGS. 1 and 2, in accordance with one or more embodiments set forth herein.

Blocks 310, 320, and 380 are related to training and retraining of a machine learning model for the cognitive rating system 100 and the viewer response based rating system 200. Blocks 330 through 370 are related to processing the input content 105 and transforming the input content 105 according to an objective indicating an outcome intended for the input content 105.

In block 310, the dynamic content rating engine 120 extracts linguistic, audio, and/or visual features of the previously rated content 117 of the training data 113. The dynamic content rating engine 120 extracts the number of available ratings, and any guidelines provided for previous ratings as addressed in respective content rating systems 115 of the training data 113. Each content rating system 115 is associated with one or more of the previously rated contents 117 in the training data 113. Then, the dynamic content rating engine 120 proceeds with block 320.

In certain embodiments of the present invention, the previously rated content 117 is respectively associated with metadata describing each of previous ratings by identifying one of the content rating system 115 and a rating for the previously rated content 117 in the identified content rating system 115. For example, the previously rated content 117 is a children's fantasy movie, that had been rated "TV-PG-13" (Parents strongly cautioned) for theater shows in the United States indicating that some material may be inappropriate for children under age thirteen (13), but later had been rated "TV-PG" for television broadcasting in the United States as having a theme that "may call for parental guidance" and/or as having some features that contain "moderate violence (V)." The same previously rated content 117 can be rated "TV-Y7-FV" for television broadcasting as being directed to children over age seven (7) if the previously rated content 117 contains "more intense or more combative" in comparison to other programs rated for "TV-Y7" that can include "mild fantasy violence or comedic violence", as children over age seven (7) are presumed to "have acquired the developmental skills needed to distinguish between make-believe and reality."

The dynamic content rating engine 120 generates the maturity classifiers 181 from the linguistic, audio, and/or visual features extracted from the previously rated contents 117 and from the issues that are likely to affect ratings in the content rating systems 115. A few examples of the issues affecting the rating of television shows in the United States for "PG-13" rating include "suggestive dialogue (D), infrequent coarse language (L), or moderate violence (V)" as well as theme of the show. Also the intensity and frequency of the presented issues in the show determines ratings in the same TV Parental Guidelines in the United States. Most of the content rating systems 115 are concerned with issues of adult content, violence, drugs or alcohol, profanity, or other types of mature content. Based on the cultural and societal background of respective locations to which the content rating system 115 are applicable, various other cultural and societal beliefs or issues can also affect the ratings in the respective content rating systems 115.

In block 320, the dynamic content rating engine 120 trains the machine learning model with interrelated features of the previously rated contents 117 as extracted from block 310, maturity classifiers 181, and prior ratings of each of the content rating systems 115. Then, the dynamic content rating engine 120 proceeds with block 330.

For the viewer response based rating system 200, the dynamic content rating engine 120 trains the viewer profiles in location G 225, along with the training data 113. The viewer profiles in location G 225 include demography, age distribution, cultural background and/or tendencies in order to ascertain a content rating system for location G. Information for the viewer profiles in location G 225 can be collected via data mining of social network postings, local news, or the similar for location G.

In block 330, the dynamic content rating engine 120 obtains the input content 105 to process and the objective indicating an outcome intended for the input content 105. Then, the dynamic content rating engine 120 proceeds with block 340.

For the viewer response based rating system 200, the dynamic content rating engine 120 obtains the in-viewing content 207 in block 330 and processes as the input content 105.

In certain embodiments of the present invention, the dynamic content rating system 120 can obtain additional inputs based on the objective. For example, if the objective involves a desired rating in a specific content rating system for the input content 105, the target level in the target rating system (TRS, TL) 109 with a valid value is provided for the dynamic content rating engine 120.

In certain embodiments of the present invention, the objective for processing the input content 107 include, but are not limited to, predicting respective ratings of the input content 105 in the content rating systems 115 of the training data 113, automatically generating a cut of the input content 105 pursuant to the target rating system and the target level 109, or automatically generating a cut of the input content 105 that matches the viewer maturity level 283.

In certain embodiments of the present invention, when implementing the viewer response based rating system 200, the dynamic content rating system 120 obtains the in-viewing content 207 and the objective to generate a cut of the in-viewing content 207 that matches the viewer maturity level 283 dynamically while the viewing is progressing. The dynamic content rating engine 120 can analyze the real-time viewer feedback at location G 205 while the audience watches a certain sample content to benchmark the viewer maturity level 283 according to the maturity classifiers 181 generated from the training data 113. The dynamic content rating engine 120 then generates auto-cut of the in-viewing content 207, at least upcoming portion of the in-viewing content 207 in buffers for video devices, based on the ascertained viewer maturity level 283 during the screening of the in-viewing content 207.

In certain embodiments of the present invention, the viewer device 230 is implemented as video camera(s) and microphone(s) installed in a theater for a group of viewers so that the dynamic content rating engine 120 collects the real-time viewer feedback at location G 205. In the same embodiment of the present invention, the dynamic content rating engine 120 sends the viewer maturity oriented content 287 resulting from the auto-cut by the viewer maturity level 283 to a digital projector of the theater for continued screening for the viewers. In other embodiments of the present invention, the viewer device 230 is implemented as a personal mobile device for an individual viewer by which the real-time viewer feedback at location G 205 is collected and the viewer maturity oriented content 287 is displayed for the viewer, as shown in FIG. 2.

In block 340, the dynamic content rating engine 120 analyzes the input content 105 obtained in block 330 and predicts one or more ratings according to the objective for the input content 105 and other information, if any. Detailed operations of block 340 are presented in FIG. 4 and corresponding description. Then, the dynamic content rating engine 120 proceeds with block 350.

In block 350, the dynamic content rating engine 120 determines the objective obtained in block 330 for further process. If the dynamic content rating engine 120 determines that the objective for the input content 105 is to automatically generate a cut of the input content 105 pursuant to the target rating system and the target level 109, that is, the target rating (TRS, TL) oriented content 185, then, the dynamic content rating engine 120 proceeds with block 360.

If the dynamic content rating engine 120 determines that the objective for the input content 105 is to automatically generate a cut of the input content 105 that matches the viewer maturity level 283, that is, the viewer maturity oriented content 287, then, the dynamic content rating engine 120 proceeds with block 370.

If the dynamic content rating engine 120 determines that the objective for the input content 105 is to predict respective ratings of the input content 105 in the content rating systems 115 of the training data 113, then, the dynamic content rating engine 120 proceeds with block 380.

In block 360, the dynamic content rating engine 120 generates the target rating (TRS, TL) oriented content 185 by applying the rating rules for the target rating system (TRS) 183 and by auto-editing the input content 105 based on the respective maturity classifiers 181 tagged for linguistic, audio, and visual features of the input content 105. The dynamic content rating engine 120 infers the rating rules of the target rating system (TRS) 183 based on prior ratings of previously rated content 117 for each of the content rating systems 115 in the training data 113, with respect to features affected the prior ratings. Then, the dynamic content rating engine 120 proceeds with block 380.

In block 370, the dynamic content rating engine 120 generates the viewer maturity oriented content 287 by applying the rating rule for location G 285 and by auto-editing the in-viewing content 207 based on the respective maturity classifiers 181 tagged for linguistic, audio, and visual features of the in-viewing content 207. For the viewer response based rating system 200, the dynamic content rating engine 120 identifies by inference which one of the content rating systems 115 would be most likely applicable in location G based on the viewer profiles in location G 225 pursuant to factors including, but not limited to, cultural similarity shown in the previously rated content 117 by each of the content rating systems 115 and cultural background at location G, as presented in the viewer profiles in location G 225. The dynamic content rating engine 120 then applies the rating rules associated with the content rating system identified for location G with respect to linguistic, audio, and visual features of the in-viewing content 207, in transforming the in-viewing content 207 to the viewer maturity oriented content 287 by auto-editing the features of the in-viewing content 207 relevant to the rating to correspond to the viewer maturity level 283. Then, the dynamic content rating engine 120 proceeds with block 380.

In block 380, the dynamic content rating engine 120 evaluates the respective outcomes of processing the input content 105 or the in-viewing content 207 according to the objective obtained in block 330. Then, the dynamic content rating engine 120 terminates a cycle of two phases in training the machine learning model and processing a media content of interest. If the outcome is successful in comparison to a preconfigured threshold, the dynamic content rating engine 120 retrains the machine learning model with the outcome from processing the input content 105 or the in-viewing content 207 as a positive result. If the outcome is unsuccessful, the dynamic content rating engine 120 retrains the machine learning model with the outcome as a negative result to adjust weights of components of the maturity classifiers 181 and the rating rules for certain content rating systems 115 as being trained from the training data 113.

Figure 4:
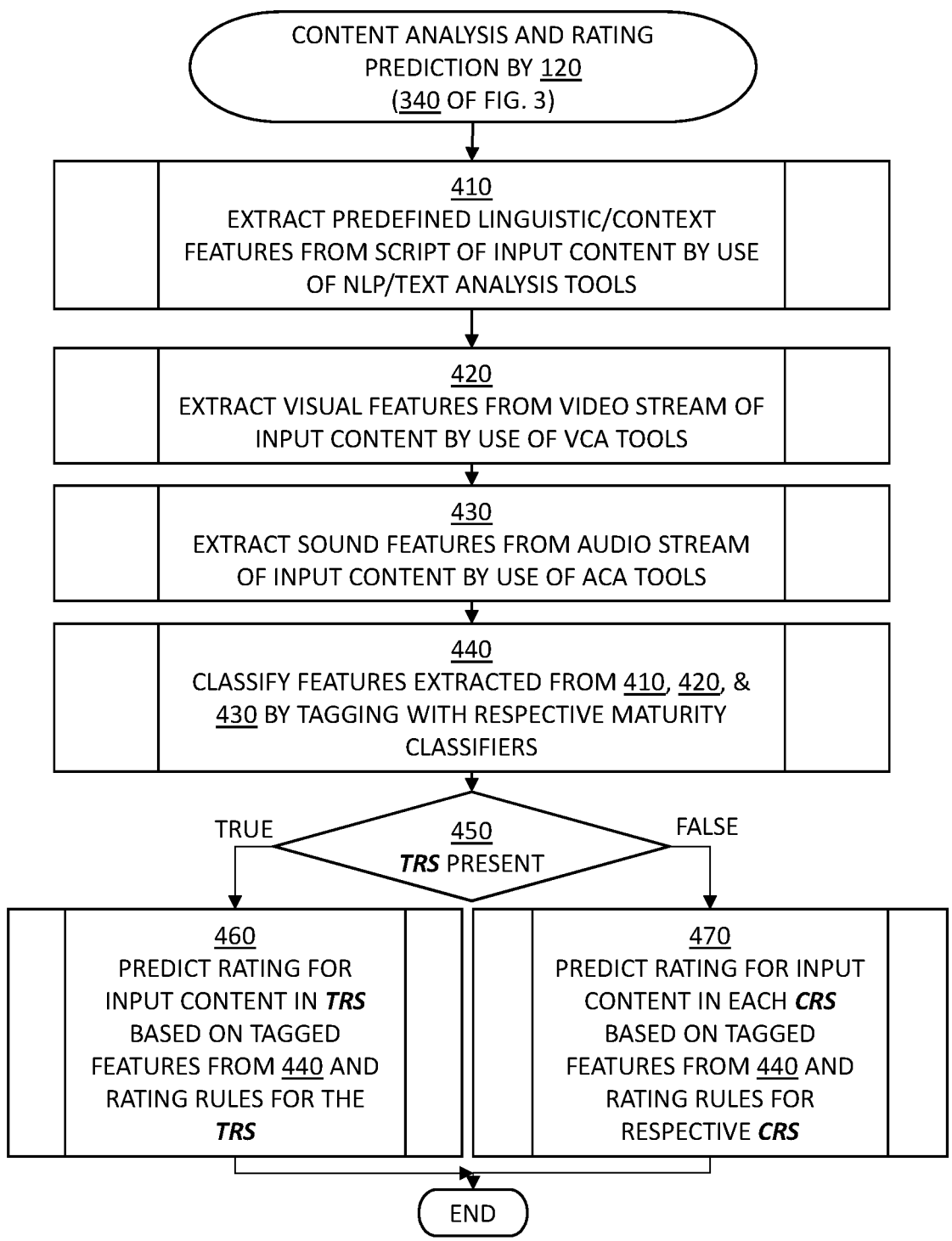
FIG. 4 depicts a flowchart for content analysis and rating prediction as performed by the dynamic content rating engine in block 340 of FIG. 3, in accordance with one or more embodiments set forth herein.

FIG. 4 depicts a flowchart for content analysis and rating prediction as performed by the dynamic content rating engine 120 in block 340 of FIG. 3, in accordance with one or more embodiments set forth herein.

In block 410, the dynamic content rating engine 120 extracts predefined linguistic/context features from the script 107 of the input content 105 by use of NLP/text analysis tools. The predefined linguistic/context features can be thematic issues addressed in some of the content rating systems 115 from the training data 113, as demonstrated by the previously rated content 117. Then, the dynamic content rating engine 120 proceeds with block 420.

In certain embodiments of the present invention, the dynamic content rating engine 120 obtains the script 107 with the input content 105 in block 330 of FIG. 3. In other embodiments of the present invention, the dynamic content rating engine 120 processes the input content 105 for the script 107 in block 430 from audio stream of the input content 107 alongside with other audio features.

In block 420, the dynamic content rating engine 120 extracts visual features from video stream of the input content 105 by use of the VCA tools 131. Then, the dynamic content rating engine 120 proceeds with block 430.

In block 430, the dynamic content rating engine 120 extracts sound features from audio stream of the input content 105 by use of the ACA tools 133. Then, the dynamic content rating engine 120 proceeds with block 440.

In certain embodiments of the present invention where the dynamic content rating engine 120 had processed the script of the input content 105 in block 410, the dynamic content rating engine 120 extracts only the audio features indicating sounds other than words. In other embodiments of the present invention where the dynamic content rating engine 120 had not obtained or processed the script 107 of the input content 105, the dynamic content rating engine 120 extracts words from the audio stream and compiles the script 107 of the input content 105 by use of the NLP tools 135, particularly, a speech-to-text tool.

In block 440, the dynamic content rating engine 120 classifies features extracted from blocks 410, 420, and 430 by tagging with respective maturity classifiers 181 as developed in the training phase. Then, the dynamic content rating engine 120 proceeds with block 450.

In block 450, the dynamic content rating engine 120 determines if a target rating system (TRS) had been designated for the input content 105 for a rating. For example, the target rating system was previously obtained as part of the target level in the target rating system (TRS, TL) 109 in block 330 of FIG. 3, where the objective is to generate an auto-cut version of the input content 105 that meets the target level in the target rating system (TRS, TL) 109. If the dynamic content rating engine 120 determines that the target rating system (TRS) was previously designated for the input content 105 to be rated, then, the dynamic content rating engine 120 proceeds with block 460. If the dynamic content rating engine 120 determines that the target rating system (TRS) was not previously designated for the input content 105 to be rated, then, the dynamic content rating engine 120 proceeds with block 470.

In block 460, the dynamic content rating engine 120 predicts a rating in the target rating system for the input content 105 based on the features tagged with the maturity classifiers 181 from block 440. The dynamic content rating engine 120 also infers the rating rules for the target rating system 183, if the rating rules for the target rating system 183 were not established in previous processes or during the training phase. Then, the dynamic content rating engine 120 proceeds with block 350 of FIG. 3.

In certain embodiments of the present invention, in cases where the target level (TL) in the target rating system obtained for the auto-cut of the input content 105 is equal to the predicted rating in the target rating system, then the dynamic content rating engine 120 bypasses block 360 of FIG. 3 as the input content 105 needs no changes by auto-cutting to meet the target level in the target rating system.

In block 470, the dynamic content rating engine 120 predicts a rating for the input content 105 in each of the content rating system 115 based on features of the input content 105 tagged with the maturity classifiers 181 from block 440. Then, the dynamic content rating engine 120 proceeds with block 350 of FIG. 3.

Certain embodiments of the present invention predict ratings of a media content by use of a machine learning model as trained with the previously rated contents in various content rating systems. Certain embodiments of the present invention extract linguistic, audio and visual features from previously rated contents in respective content rating systems from the training data and generate various maturity classifiers indicative of respective maturity levels. Certain embodiments of the present invention extract linguistic, audio and visual features from the media content that had been of interest in ratings of the training data and tags the extracted features of the media content with respective maturity classifiers as developed from the training data. Certain embodiments of the present invention automatically transform the media content for a target level in a target rating system by auto-cutting of features tagged with certain maturity classifiers from the input content to make the input content suitable for a particular audience. Certain embodiments of the present invention infer an applicable content rating system based on a geographical location, ascertain the level of maturity of the viewers by use of real-time viewer feedback, and automatically transform the media content to be suitable for the maturity level of the viewers by auto-cutting features tagged with any maturity classifiers that would be more mature than the viewer maturity level. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The dynamic content rating and desired maturity based auto-cutting service can be provided for subscribed business entities/vendors of software applications in need from any location in the world.

Figure 5:
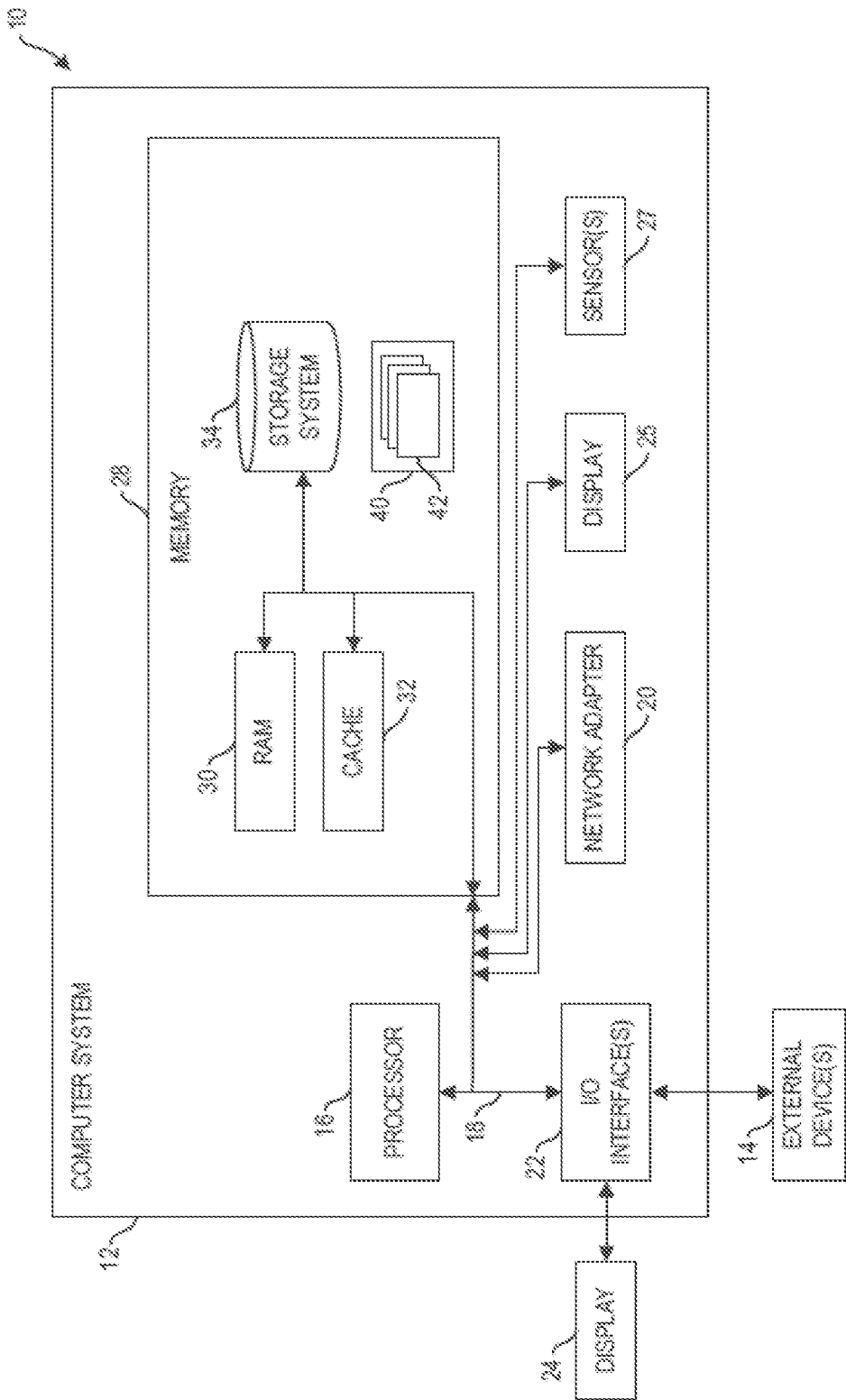
FIG. 5 depicts a cloud computing node according to an embodiment of the present invention.
Figure 6:
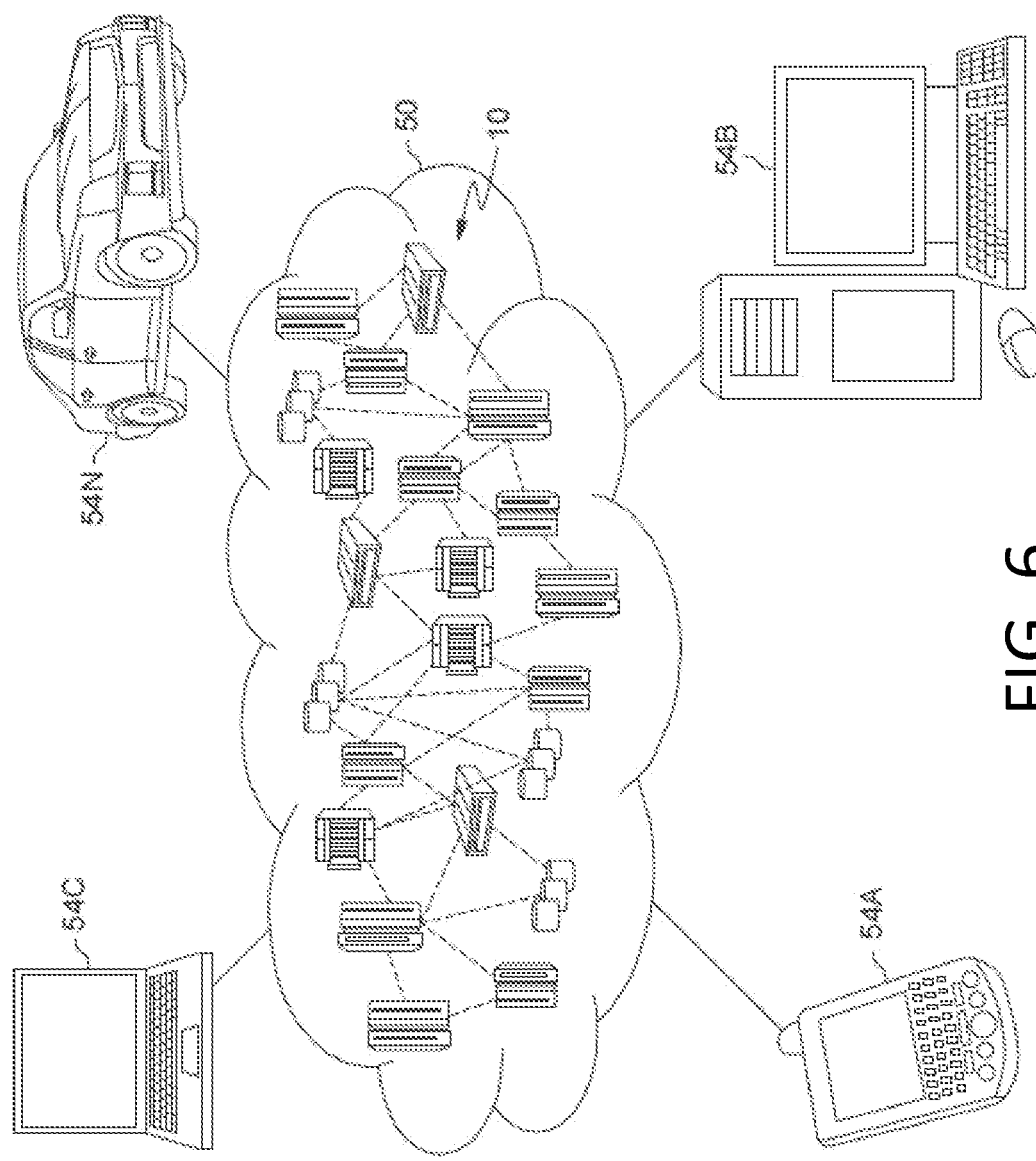
FIG. 6 depicts a cloud computing environment according to an embodiment of the present invention.
Figure 7:
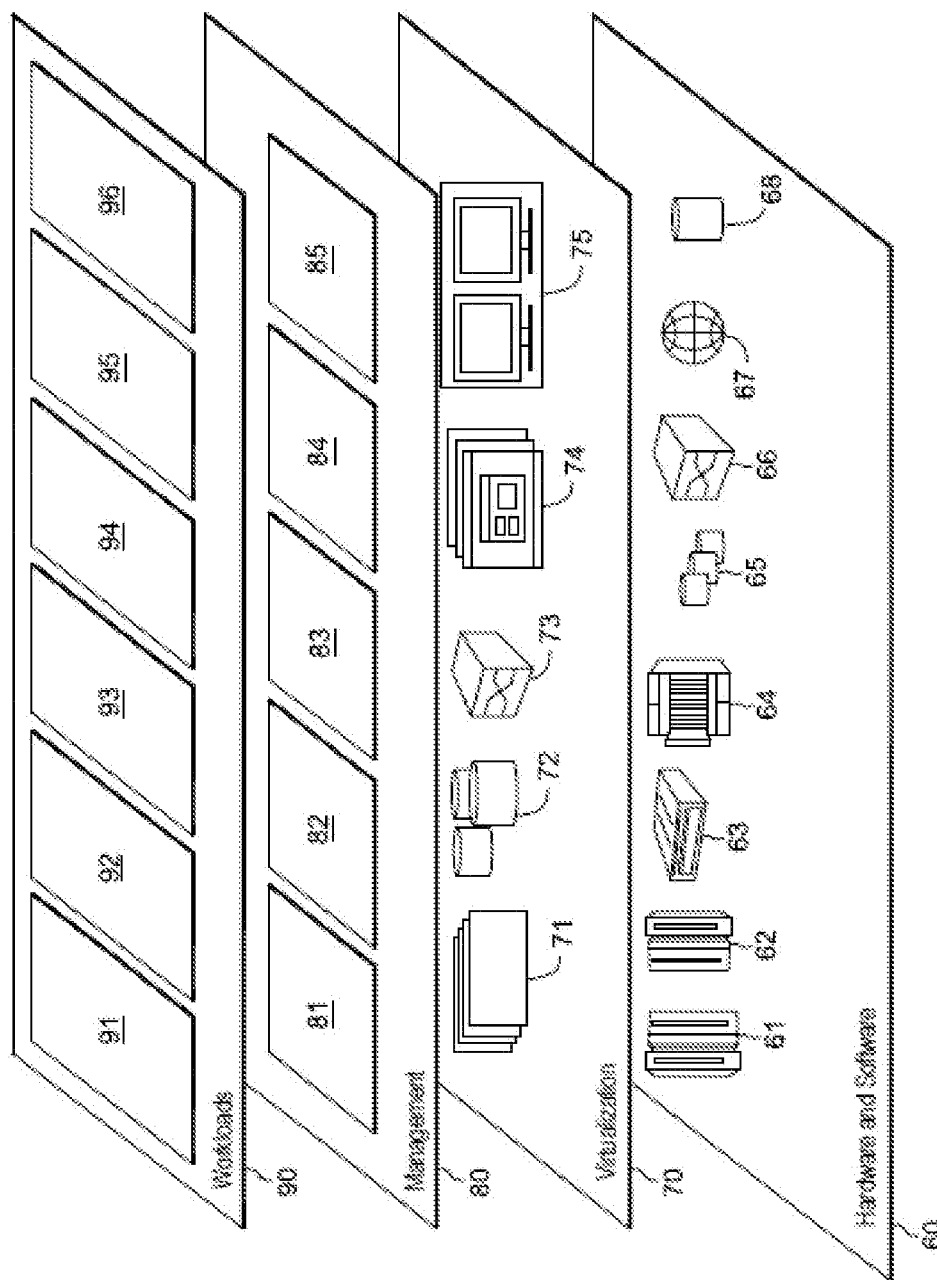
FIG. 7 depicts abstraction model layers according to an embodiment of the present invention.

FIGS. 5-7 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the dynamic content rating engine 120 of FIGS. 1 and 2. Program processes 42, as in the dynamic content rating engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the dynamic content rating engine and the machine learning model 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A system comprising:
    a memory;
    one or more processor in communication with the memory; and
    program instructions executable by the one or more processor via the memory to perform a method comprising:
    training a machine learning model for predicting a rating in respective content rating systems based on training data including previously rated contents associated with the respective content rating systems, wherein the machine learning model includes a plurality of maturity classifiers corresponding to individual features of the previously rated contents and rating rules respective to the content rating systems;
    obtaining an input content and an objective indicating how to process the input contents, wherein the input content includes at least a video stream and an audio stream;
    extracting linguistic features, visual features, and audio features of the input content by use of respective content analysis tools, wherein the extracting the linguistic features includes subjecting text to natural language processing, wherein the extracting the visual features includes processing the video stream, and wherein the extracting the audio features includes processing the audio stream; and
    classifying the linguistic features, the visual features, and the audio features of the input content as extracted by tagging with respective maturity classifiers of the machine learning model so that the linguistic features of the input content are tagged with a linguistic feature maturity classifier, the visual features of the input content are tagged with a visual feature maturity classifier, and the audio features of the input content are tagged with an audio feature maturity classifier, wherein the method include training a machine learning model for predicting a rating in respective content rating systems based on training data including previously rated contents associated with the respective content rating systems, wherein the machine learning model includes a plurality of maturity classifiers corresponding to individual features of the previously rated contents; obtaining an input content and an objective indicating how to process the input contents; extracting linguistic, visual, and audio features of the input content by use of respective content analysis tools; classifying the features of the input content as extracted by tagging with respective maturity classifiers of the machine learning model; obtaining, from a viewer device, real-time viewer feedback at a location on in-viewing content, wherein the machine learning model is trained with viewer profiles for the location; determining one of the content rating systems in the training data as being applicable at the location; determining a viewer maturity level based on the real-time viewer feedback and the viewer profiles for the location, predicting a rating of the in-viewing content based on the one content rating system applicable for the location; ascertaining that the viewer maturity level of the in-viewing content is less mature than the rating of the in-viewing content as predicted; transforming the in-viewing content to a viewer maturity oriented content by auto-cutting features that are associated with maturity classifiers that contributed to the rating of the in-viewing content that is more mature than the viewer maturity level in the one content rating system applicable for the location; and auto-cutting, in real time, the in-viewing content to the viewer using the auto-cutting features.

2. The system of claim 1, further comprising:
    predicting a rating of the input content for each of the content rating systems of the training data;
    evaluating ratings of the input content in the content rating systems as predicted based on a preconfigured threshold; and
    retraining the machine learning model by updating the training data with the ratings as associated with the input content for the respective content rating systems.

3. The system of claim 1, further comprising:
    obtaining a target rating system for the input content, wherein the target rating system is analogous to one of the content rating systems of the training data;
    predicting a rating of the input content in the target rating system;
    evaluating the rating of the input content in the target rating systems as predicted based on a preconfigured threshold; and
    retraining the machine learning model by updating the training data with the rating in the target rating system as associated with the input content.

4. The system of claim 3, further comprising:
    obtaining a target level in the target rating system for the input content;
    predicting a rating of the input content in the target rating system;
    ascertaining that the target level of the input content is less mature than the rating of the input content as predicted; and
    transforming the input content to a target rating oriented content by auto-cutting features that are associated with maturity classifiers that contributed to the rating of the input content that is more mature than the target level in the target rating system.

5. The system of claim 1, wherein the method includes auto-editing the input content presented as in-viewing content, wherein the auto-editing includes using each of (a) the linguistic feature maturity classifier for the linguistic features of the input content, (b) the visual feature maturity classifier for the visual features of the input content, and (c) the audio feature maturity classifier for the audio features of the input content.

6. The system of claim 1, wherein the method includes auto-editing the input content presented as in-viewing content.

7. The system of claim 1, wherein the method includes auto-editing the input content presented as in-viewing content, wherein the auto-editing includes using the linguistic feature maturity classifier for the linguistic features of the input content.

8. The system of claim 1, wherein the method includes auto-editing the input content presented as in-viewing content, wherein the auto-editing includes using the visual feature maturity classifier for the visual features of the input content.

9. The system of claim 1, wherein the method includes auto-editing the input content presented as in-viewing content, wherein the auto-editing includes using the audio feature maturity classifier for the audio features of the input content.

10. A computer implemented method comprising:
training a machine learning model for predicting a rating in respective content rating systems based on training data including previously rated contents associated with the respective content rating systems, wherein the machine learning model includes a plurality of maturity classifiers corresponding to individual features of the previously rated contents and rating rules respective to the content rating systems;
obtaining an input content and an objective indicating how to process the input contents, wherein the input content includes at least a video stream and an audio stream;
extracting linguistic features, visual features, and audio features of the input content by use of respective content analysis tools, wherein the extracting the linguistic features includes subjecting text to natural language processing, wherein the extracting the visual features includes processing the video stream, and wherein the extracting the audio features includes processing the audio stream; and
classifying the linguistic features, the visual features, and the audio features of the input content as extracted by tagging with respective maturity classifiers of the machine learning model so that the linguistic features of the input content are tagged with a linguistic feature maturity classifier, the visual features of the input content are tagged with a visual feature maturity classifier, and the audio features of the input content are tagged with an audio feature maturity classifier, wherein the method includes the training the machine learning model for predicting a rating in respective content rating systems based on training data including the previously rated contents associated with the respective content rating systems, wherein the machine learning model includes the plurality of maturity classifiers corresponding to individual features of the previously rated contents; the obtaining the input content and the objective indicating how to process the input contents; the extracting the linguistic, visual, and audio features of the input content by use of the respective content analysis tools; classifying the features of the input content as extracted by the tagging with respective maturity classifiers of the machine learning model; obtaining, from a viewer device, real-time viewer feedback at a location on in-viewing content, wherein the machine learning model is trained with viewer profiles for the location; determining one of the content rating systems in the training data as being applicable at the location; determining a viewer maturity level based on the real-time viewer feedback and the viewer profiles for the location, predicting a rating of the in-viewing content based on the one content rating system applicable for the location; ascertaining that the viewer maturity level of the in-viewing content is less mature than the rating of the in-viewing content as predicted; transforming the in-viewing content to a viewer maturity oriented content by auto-cutting features that are associated with maturity classifiers that contributed to the rating of the in-viewing content that is more mature than the viewer maturity level in the one content rating system applicable for the location; and auto-cutting, in real time, the in-viewing content to the viewer using the auto-cutting features.

11. The computer implemented method of claim 10, further comprising:
predicting a rating of the input content for each of the content rating systems of the training data;
evaluating ratings of the input content in the content rating systems as predicted based on a preconfigured threshold; and
retraining the machine learning model by updating the training data with the ratings as associated with the input content for the respective content rating systems.

12. The computer implemented method of claim 10, further comprising:
obtaining a target rating system for the input content, wherein the target rating system is analogous to one of the content rating systems of the training data;
predicting a rating of the input content in the target rating system;
evaluating the rating of the input content in the target rating systems as predicted based on a preconfigured threshold; and
retraining the machine learning model by updating the training data with the rating in the target rating system as associated with the input content.

13. The computer implemented method of claim 12, further comprising:
obtaining a target level in the target rating system for the input content;
predicting a rating of the input content in the target rating system;
ascertaining that the target level of the input content is less mature than the rating of the input content as predicted; and
transforming the input content to a target rating oriented content by auto-cutting features that are associated with maturity classifiers that contributed to the rating of the input content that is more mature than the target level in the target rating system.

14. The computer implemented method of claim 10, wherein the method includes auto-editing the input content presented as in-viewing content, wherein the auto-editing includes using each of (a) the linguistic feature maturity classifier for the linguistic features of the input content, (b) the visual feature maturity classifier for the visual features of the input content, and (c) the audio feature maturity classifier for the audio features of the input content.

15. The computer implemented method of claim 10, wherein the method includes auto-editing the input content presented as in-viewing content.

16. The computer implemented method of claim 10, wherein the method includes auto-editing the input content presented as in-viewing content, wherein the auto-editing includes using the linguistic feature maturity classifier for the linguistic features of the input content.

17. The computer implemented method of claim 10, wherein the method includes auto-editing the input content presented as in-viewing content, wherein the auto-editing includes using the visual feature maturity classifier for the visual features of the input content.

18. The computer implemented method of claim 10, wherein the method includes auto-editing the input content presented as in-viewing content, wherein the auto-editing includes using the audio feature maturity classifier for the audio features of the input content.

19. A computer program product comprising:
a computer readable storage medium readable by one or more processing circuit and storing instructions for execution by one or more processor for performing a method comprising:
training a machine learning model for predicting a rating in respective content rating systems based on training data including previously rated contents associated with the respective content rating systems, wherein the machine learning model includes a plurality of maturity classifiers corresponding to individual features of the previously rated contents and rating rules respective to the content rating systems;
obtaining an input content and an objective indicating how to process the input contents, wherein the input content includes at least a video stream and an audio stream;
extracting linguistic features, visual features, and audio features of the input content by use of respective content analysis tools, wherein the extracting the linguistic features includes subjecting text to natural language processing, wherein the extracting the visual features includes processing the video stream, and wherein the extracting the audio features includes processing the audio stream; and
classifying the linguistic features, the visual features, and the audio features of the input content as extracted by tagging with respective maturity classifiers of the machine learning model so that the linguistic features of the input content are tagged with a linguistic feature maturity classifier, the visual features of the input content are tagged with a visual feature maturity classifier, and the audio features of the input content are tagged with an audio feature maturity classifier, wherein the method includes the training the machine learning model for predicting a rating in respective content rating systems based on training data including the previously rated contents associated with the respective content rating systems, wherein the machine learning model includes the plurality of maturity classifiers corresponding to the individual features of the previously rated contents; the obtaining the input content and the objective indicating how to process the input contents; the extracting the linguistic, visual, and audio features of the input content by use of respective content analysis tools; the classifying the features of the input content as extracted by tagging with respective maturity classifiers of the machine learning model; obtaining, from a viewer device, real-time viewer feedback at a location on in-viewing content, wherein the machine learning model is trained with viewer profiles for the location; determining one of the content rating systems in the training data as being applicable at the location; determining a viewer maturity level based on the real-time viewer feedback and the viewer profiles for the location, predicting a rating of the in-viewing content based on the one content rating system applicable for the location; ascertaining that the viewer maturity level of the in-viewing content is less mature than the rating of the in-viewing content as predicted; transforming the in-viewing content to a viewer maturity oriented content by auto-cutting features that are associated with maturity classifiers that contributed to the rating of the in-viewing content that is more mature than the viewer maturity level in the one content rating system applicable for the location; and auto-cutting, in real time, the in-viewing content to the viewer using the auto-cutting features.

20. The computer program product of claim 19, wherein the method includes auto-editing the input content presented as in-viewing content.

* * * * *